UNITED STATES PATENT OFFICE.

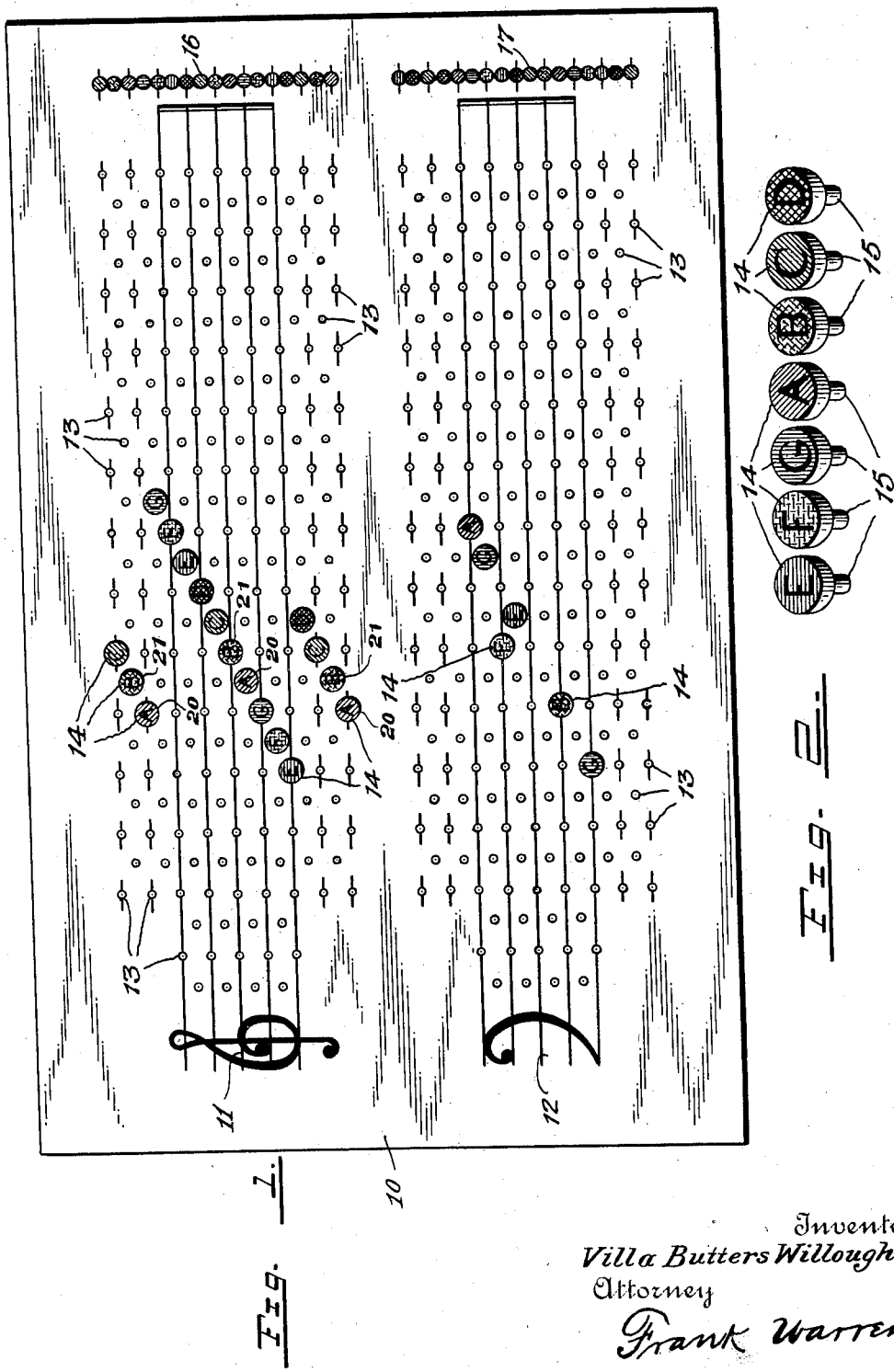

VILLA B. WILLOUGHBY, OF SEATTLE, WASHINGTON.

MUSIC CHART.

1,412,587.      Specification of Letters Patent.     Patented Apr. 11, 1922.

Application filed February 15, 1921. Serial No. 445,177.

*To all whom it may concern:*

Be it known that I, VILLA B. WILLOUGHBY, a citizen of the United States, residing at Seattle, in the county of King and State of Washington, have invented a certain new and useful Improvement in Music Charts, of which the following is a specification.

My invention relates to improvements in music charts and the object of my invention is to provide a music chart in the nature of a game by means of which the fundamental principles of music may be entertainingly impressed on the minds of children and novices in the art.

Another object is to provide a music chart having a pleasing colour scheme whereby the relative positions of the different notes on the staff may be attractively and definitely fixed on the minds of elementary pupils by associating the said notes with said colour scheme.

A further object is to provide a music chart which is simple and attractive in design, direct and effective in its purpose, comparatively inexpensive to manufacture and which will dispense with the employment of a teacher.

With the above and other objects in view which will appear as the description proceeds, my invention consists of the novel construction, adaptation, arrangement and combination of parts hereinafter described and claimed.

I accomplish these objects by devices illustrated in the accompanying drawings, wherein—

Figure 1 is a plan view of a music chart embodying the elements of my invention; and Fig. 2 is a view in perspective showing a plurality of pegs having the letters of the music scale inscribed thereon, together with their corresponding colours.

Referring to the drawings, throughout which like reference numerals designate like parts, the numeral 10 indicates a back board upon which is inscribed a double or grand staff and adjacent to the left hand end of the upper staff section is printed across the face of the staff in the usual manner, a treble clef 11 and below the latter on the corresponding portion of the lower staff section, the usual bass clef 12. Either of the above mentioned staff sections are adapted to be used independently of the other.

The board 10 is perforated as indicated at 13 at a plurality of equi-distant intervals on the lines of the staff and in the spaces, the perforations extending both above and below the staff.

The numeral 14 indicates the discs of pegs having reduced ends 15 which are adapted to be inserted in the perforations 13.

The discs 14 of said pegs are flat on the top ends and have letters or characters inscribed thereon. Each of said letters or characters has its own distinctive colour also stamped on its disc forming a back ground for said letter or character, as indicated in Fig. 2, for illustration, the letters E, F, G, A, B, C, and D are shown having their respective colours blue, yellow, red, green, orange, purple and pink.

Stamped on the right hand marginal portion of the board 10 adjacent to each of the staffs 11 and 12 are colour schemes as indicated at 16 and 17. Each of said colour schemes comprises a plurality of circles vertically arranged and in alignment with the spaces and lines of said staffs. The said circles are each stamped with colours adapted to indicate the different notes corresponding to the lines and spaces of said staff.

The method of instructing or teaching a pupil to read music by means of my music chart is as follows: The pupil selects a peg having a letter inscribed thereon, as for example, the letter A, which letter is represented or indicated as green in colour; the pupil then refers to either the colour scheme 16 of the upper staff section or the colour scheme 17 of the lower staff section for the corresponding colour and places or inserts the peg in any one of the perforations of the row of perforations disposed in alignment and in prolongation with said colour, as for example, as indicated at 20 in Fig. 1.

The pupil next selects a peg such as B, which letter is represented as orange in colour, and again refers to the colour scheme for the corresponding colour and inserts said peg in one of the perforations of the row of perforations disposed in alignment with said colour, as for example, as indicated at 21 in Fig. 1.

The pupil continues to select in succession pegs having the letters C, D, and so on, each of which pegs are represented by an individual colour and refers to the colour scheme for the corresponding colour and insert the same as hereinbefore described for the letters A and B.

It will therefore be apparent from the foregoing that the purpose of this exercise is to impress upon and indelibly fix in the mind of the pupil the position or location and significance of the various lines and spaces comprising or constituting the upper and lower staff sections which lines and spaces denote or designate definite positions for the various symbols or characters used in music, to thus train the mind of the pupil to immediately determine the nature and position of any specific symbol or character when reading music.

When the pupil has become proficient in the placing of the pegs in their proper perforations or positions, a simple composition is then employed and the pupil is directed to copy the same upon the chart 10 to thereby still further definitely fix in the mind of the pupil the correct positions of the musical symbols or characters upon the staff sections.

Having thus established in the mind of the pupil the correct and definite positions of the various musical symbols or characters, the chart 10 may now be dispensed with and the pupil will be able to read music directly from the printed page.

To prevent confusion in the mind of the pupil when copying music on the chart from a printed page, I have disposed the colour scheme 16 and 17 separately or to one side of the staff section, for the reason that after having once learned the location and significance of the various lines or spaces of said staff sections the pupil has no further need for said colour scheme.

In copying music from the printed page pegs having the symbols or characters of music inscribed thereon may be used to still further facilitate the instruction of the pupil and to teach the pupil to copy said music independently and without the aid of the colour scheme.

While I have shown certain characters representing whole notes, it will be understood that characters such as fractional notes, sharps, flats, rests and various other characters may likewise be employed in the manner shown.

From the foregoing description taken in connection with the accompanying drawings, the advantages of the construction and of the method of operation of my music chart will be readily apparent to those desirous of becoming skilled in the art to which my invention pertains, to thus enable those so desirous to construct and operate the same, but, while I have shown and described the construction and operation of a music chart embodying the features and principles of my invention, which I now consider to be the best embodiment thereof, I desire to have it understood that the music chart shown is merely illustrative and that such changes may be made when desired as are within the scope of my invention and embodied in the accompanying claims.

What I claim is:

1. An apparatus for teaching music comprising a base board, a chart on said board having on one face thereof a musical staff section, said board and said chart having a plurality of spaced parallel rows of perforations formed upon and between the lines of said section, a plurality of aligned vari-colored characters disposed in parallel relation to and adjacent one edge of said chart, said characters being also disposed in alignment and in prolongation to said rows of perforations to thus designate each of said rows with a definite and distinctive colour, and a plurality of vari-coloured markers having symbols inscribed thereon adapted to be inserted in the perforations of the rows of corresponding colour.

2. An apparatus for teaching music comprising a rectangular baseboard, a chart on said board having on one side thereof a plurality of musical staff sections, said board and said chart having a plurality of spaced parallel rows of perforations formed upon and between the lines of said sections, a plurality of aligned vari-colored characters being disposed in parallel relation to and adjacent one edge of said chart and in spaced relation with respect to the ends of said sections, said characters being also disposed in alignment and in prolongation to said rows of perforations, to thus designate each of said rows with a definite and distinctive colour, and a plurality of vari-coloured disc-like pegs having musical symbols inscribed thereon adapted to be inserted in the perforations of the rows of corresponding colour.

In witness whereof, I hereunto subscribe my name this 8th day of February A. D. 1921.

VILLA B. WILLOUGHBY.